United States Patent [19]

Hargis

[11] 4,101,393

[45] Jul. 18, 1978

[54] METHOD OF CLEANING FILTER BAGS IN A SYSTEM FOR EFFLUENT GAS RECYCLING AND RECOVERY FROM ELECTROLYTIC CELLS FOR PRODUCTION OF ALUMINUM FROM ALUMINUM CHLORIDE

[75] Inventor: Robert L. Hargis, Palestine, Tex.

[73] Assignee: Aluminum Company of America, Pittsburgh, Pa.

[21] Appl. No.: 808,780

[22] Filed: Jun. 22, 1977

[51] Int. Cl.² .............................................. C25C 3/06
[52] U.S. Cl. ..................................................... 204/67
[58] Field of Search ........................................ 204/67

[56] References Cited

U.S. PATENT DOCUMENTS 3,904,494   9/1975   Jacobs et al. ............................ 204/67

Primary Examiner—John H. Mack
Assistant Examiner—H. A. Feeley

Attorney, Agent, or Firm—Patrick J. Viccaro

[57] ABSTRACT

A method is provided for the controlled cleaning of aluminum chloride contaminated filtering means used in a system for recovery of gaseous effluents formed in the production of aluminum from aluminum chloride. The method includes transferring filtering units from the system to a cleaning vessel, placing them inside the vessel and sealing the vessel from the environment. Water is flowed into the lower portions of the vessel to immerse the units to cause the aluminum chloride to react with the water, giving off gaseous and liquid products of reaction. Gaseous materials are exhausted from the upper portion of the vessel to a fugitive gas system and the liquid products are discharged from a separate exhaust means. Filtering materials are then stripped from the units to be disposed of without polluting the environment.

An apparatus is also provided for carrying out the method of the present invention.

2 Claims, 2 Drawing Figures

METHOD OF CLEANING FILTER BAGS IN A SYSTEM FOR EFFLUENT GAS RECYCLING AND RECOVERY FROM ELECTROLYTIC CELLS FOR PRODUCTION OF ALUMINUM FROM ALUMINUM CHLORIDE

BACKGROUND OF THE INVENTION

This invention relates to the recycling and recovery of effluent gas generated during the production of aluminum from aluminum chloride. More particularly, it relates to a method of and apparatus for cleaning filter bags contaminated with aluminum chloride during the recycling and recovery of effluent gas.

In the production of aluminum by electrolysis of aluminum chloride in an electrolyte, one of the many problems that had to be overcome involved the handling and disposition of effluent gas from the electrolytic reduction cell. One method for recycling and recovering effluent gas is described in U.S. Pat. No. 3,904,494, issued Sept. 9, 1975, which generally relates to the selective condensation and separation of aluminum chloride and mixtures therewith resulting in a production of chlorine gas of relatively high purity and effectively free of condensable impurities therein. A demister is described for removing condensed liquid in droplet form on a mat, such as one made of quartz, glass, cloth bags or the like. The condensed liquid may include various alkali and/or alkaline earth metal halides in combination with aluminum chloride values along with small amounts of aluminum chloride. Additionally, residual effluent gas is further purified by removal of finer-sized solid contaminants, such as aluminum chloride, by passage of the gas through a permeable filter media, preferably a filter of the dry or fabric type.

Periodically, the mat or cloth bags of the demister and the dry or fabric type filter of the permeable filter become covered with solid contaminants and must be removed from the system to be replaced with new filtering materials. The disposal of the filter materials which are contaminated with aluminum chloride is the problem to which the present invention relates.

Generally, the demister and permeable filter include filtering means, such as units which utilize "tube sheets" and "bag cages", respectively, over which filtering material is positioned. Such filtering materials, for example cloth filter bags, during cleaning emit noxious gases and aluminum chloride thereon will chemically burn flesh if not properly handled and disposed of. Such proper disposal is in accord with the desire to provide a safer working environment. The referred to "tube sheets" and "bag cages" are further described hereinbelow.

In the past stripping of the filter bags was a very undesirable job. Sometimes water was sprayed on the bags while still on the tube sheets and bag cages to neutralize the aluminum chloride ($AlCl_3$), but large quantities of fume, including $Al_2O_3$, HCl and steam, were generated. Additionally, the bags may have been stripped from the tube sheets and bag cages while they were still contaminated with aluminum chloride.

Though hydrolysis of aluminum chloride is known in the art, and though it is common practice to wash aluminum chloride with water, there still exists a need to dispose of aluminum chloride contaminated filter bags in a safe, controlled manner without polluting the environment and without undue risk to operators.

SUMMARY OF THE INVENTION

In accordance with the present invention, the filtering means of a demister and permeable filter, which separate particulate aluminum chloride from the gas effluent, are cleaned in a safe and controlled manner so that they may be disposed of without polluting the environment. Filtering means, including filtering material on which particulate of aluminum chloride accumulates, is transferred as a unit from the recovery system to a vessel for cleaning and is placed inside the vessel which is then sealed from the surrounding environment. Water is flowed into the vessel from the lower portion of the vessel until it is filled such that the filtering means of the separating means are immersed in the water. As the water level rises in the vessel and contacts the contaminated filtering materials, the water chemically reacts with the aluminum chloride particulate. Gaseous reaction products in the vessel are discharged from an exhaust opening at the upper portion of the vessel. Water and products of reaction contained in the water are discharged from a drain opening at the lower portion of the vessel. After the gaseous and liquid products are discharged to their respective, fugitive systems, the cleaned filtering units can be removed from the vessel.

An advantage of the method and apparatus of the present invention is that it can be practiced near and about the apparatus for recycling and recovery of effluent gases from an electrolytic cell for the production of aluminum from aluminum chloride. The periodic cleaning and removal of contaminated filtering materials from the demister and permeable filter is facilitated in a controlled manner with a reduced risk to operators.

DETAILED DESCRIPTION OF THE PREFERRED EMBODIMENTS OF THE INVENTION

Figure 1:
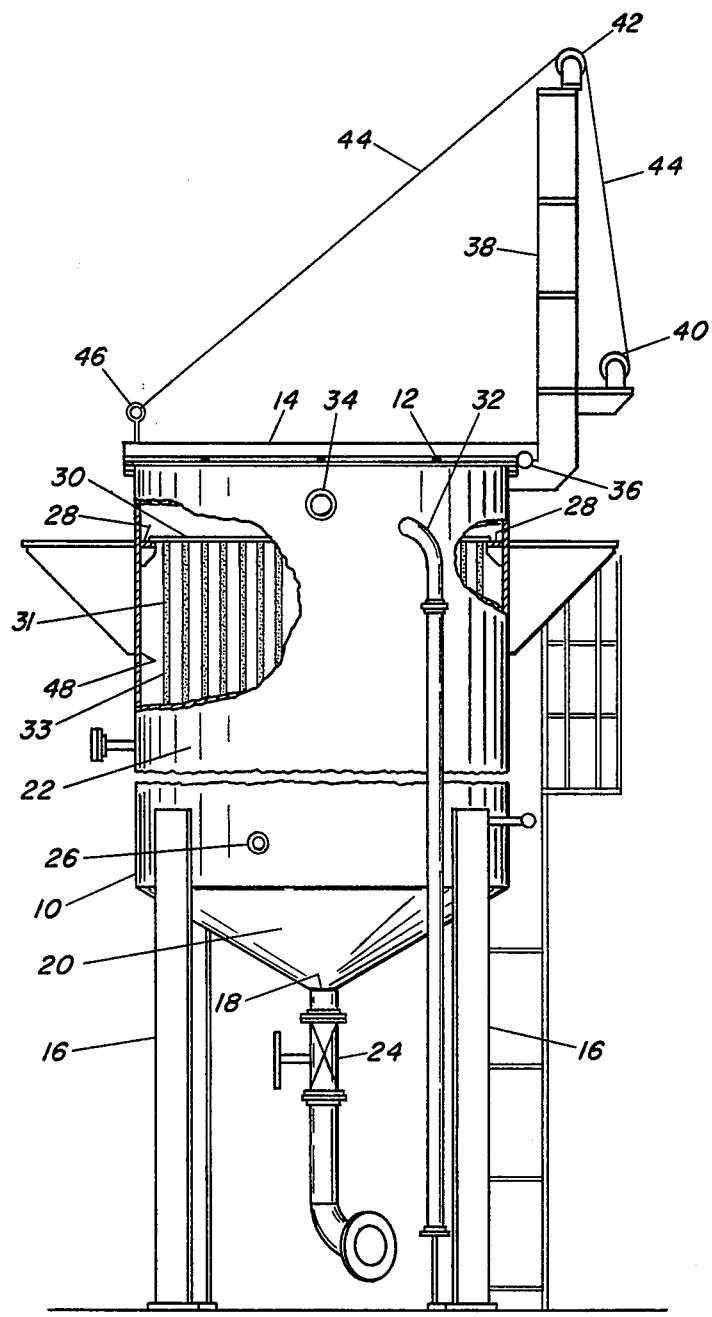
FIG. 1 is an elevated view in partial cross section illustrating a preferred embodiment of the apparatus of the present invention.

FIG. 1 illustrates a preferred embodiment of a vessel 10 of the present invention. Vessel 10 includes support posts 16 on its lower portion and an access opening 12 in its upper portion which is closed by a hinged lid 14. Vessel 10 may take any number of a variety of shapes with the cylindrical shape shown being merely illustrative. Access opening 12 in the top portion of vessel 10 permits the contaminated filtering means to be placed in the interior of vessel 10 for cleaning. Access opening 12 may be as large as the internal dimension of vessel 10, as shown in FIG. 1, or it may be a smaller opening in a top wall portion of upper sidewall portion of vessel 10.

At the lower end of vessel 10 illustrated in FIG. 1, is a first exhaust opening or drain 18 for the discharge of liquids contained in vessel 10. Drain 18 may be in a bottom wall 20 of vessel 10 or in a lower portion of sidewall 22 of vessel 10. Preferably vessel 10 has a cone-shaped bottom 20, as shown in FIG. 1. It is desirable, however, that drain 18 be low enough in vessel 10 to permit complete discharge of any liquids contained therein by the force of gravity. For controlling the discharge of liquids through drain 18, there is a valve 24 which, preferably, is made of anti-corrosive material such as nickel, stainless steel or the like.

Located at a position at or above the horizontal plane in which drain 18 lies is an inlet port 26 for supplying water as the cleaning agent to vessel 10. Though the exact location of inlet port 26 is not critical, preferably, it is located in the lower portion of vessel 10 (e.g. below the midpoint of sidewall 22) at a higher elevation than drain 18. Location of port 26 in the lower portion of vessel 10 permits water to be flowed into vessel 10 without unnecessary splashing and in a controlled manner such that vessel 10 will fill with water in a substantially steady and even manner, so as to begin the cleaning process of the filtering units. Drain 18 may be located lower than port 26 at the same elevation as port 26 or may be the same port opening. Each arrangement facilitates complete liquid discharge.

On the interior of vessel 10, as shown in the partial cut-away section, are provided internal supports 28 upon which rest the filtering means, i.e. assembled units of tube sheets and bag cages with filtering material thereon, of the separating means (demister and permeable filter). Internal supports 28 may be projections jutting inwardly from the interior wall of vessel 10 such as to provide a place for the perimeter of the filtering units 30 to contact for support. These internal supports 28 are at a higher elevation than the inlet water port 26, but are, preferably, arranged such that they are below the normal water level line to insure complete immersion of filtering units 30.

The interior of vessel 10 will be subjected to a corrosive environment during the cleaning process. For that reason, it is preferred that vessel 10 be lined with a corrosion resistant material 48 such as a painted epoxy or Teflon coating. Alternatively, the vessel could be constructed of corrosion-resistant material, such as nickel, stainless steel or the like.

Vessel 10 may be provided with an overflow relief pipe, shown at 32. Though overflow relief 32 is not necessary to the practice of the invention, for safety reasons it may be located at a position in sidewall 22 higher than the internal supports 28.

A second exhaust opening 34, preferably located above the internal supports 28, is for exhausting gaseous materials resulting during the cleaning process. Additionally, it is preferred that exhaust opening 34 be higher than the uppermost extremity of filtering units 30 on supports 28 to be above the normal water level line of vessel 10. Usually, opening 34 is also above the overflow water level at pipe 32. Second exhaust opening 34 may be connected to a fugitive fume system within the plant for removal and treatment of the gaseous materials.

Vessel 10 may also be provided with several other bleed-type nozzles on the sidewall portions thereof to provide further control of the interior gaseous and liquid materials.

As shown in FIG. 1, lid 14 is hinged at 36 for closing access opening 12 at the upper portion of vessel 10. One such hinge arrangement includes a vertical support 38 attached to the sidewall 22 of vessel 10 and projected above the upper edge of vessel 10. A pulley 40 and a second pulley 42 are attached to the lower and upper portions, respectively, of support 38. Cable 44 extends from pulley 40 upwards around pulley 42 and attaches to an eyelet or fastening means 46 on or near the end of lid 14 opposite hinge 36. As cable 44 is wound around pulley 40, lid 14 is caused to rotate about hinge 36 such that the end of lid 14 at eyelet 46 begins to rise and provides an entrance to access opening 12 of vessel 10.

Figure 2:
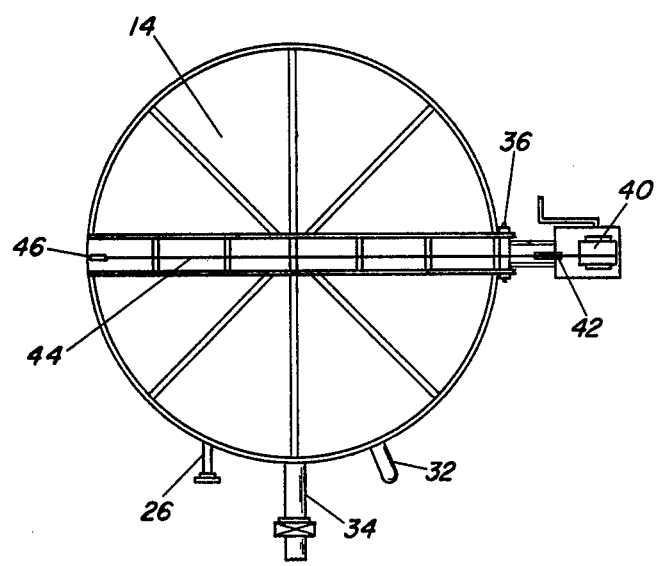
FIG. 2 is a top view of the apparatus of FIG. 1.

FIG. 2 further illustrates the arrangement of lid 14 on vessel 10 in a top view thereof. FIG. 2 shows a generally circular or ovate lid 14 hinged at 36 such that cable 44 passes from eyelet or fastening means 46 over pulley 42 and is wrapped around pulley 40 to give access to opening 12.

In the use of the method of the present invention in a system, disclosed in U.S. Pat. No. 3,904,494, cited above and incorporated herein by reference, for recycling and recovering effluent gases from electrolytic cells for the production of aluminum from aluminum chloride, the filtering unit portions 30 of the demister and permeable filter to be cleaned include what are generally referred to as "tube sheets" and "bag cages", respectively. Demister tube sheets include a plurality of tubular members 31 usually made of heavy gauge sheet metal with small holes therethrough. The tube sheet consists generally of a planar metal sheet with larger holes aligned with tubular members 31 protruding therebelow as shown in the partial cut-away view of FIG. 1. Over these tubular projections 31 are placed filtering materials 33 upon which liquids condense in droplet form. These materials, as described earlier, may be a mat made of quartz, glass, but are preferably wool felt which act like a sock or bag that may be slipped on and off the tubular sections. The tubular projections 31, and thus the bag-like material 33 covering them, may be about 10 inches in diameter by about 7½ to 8 feet long. Similarly, the "bag cages" of the permeable filter may have a similar wool felt material in the shape of a sock or bag covering thereon. The bag cages are very similar to the tube sheets in size and shape and are usually made of a wire screen or cage. For both the tube sheets and bag cages the particulate of aluminum chloride and aluminum chloride combinations collect on the outside of the filter bags as the recycling effluent gas passes from the outside to the inside of the filtering material in the recycling system.

In the method of operation of the present invention, the tube sheets or bag cages are transferred, as a unit with the filtering material still attached to the tubular projections, to the interior of vessel 10 for cleaning. The tube sheets and bag cages are placed on internal supports 28 such that the tubular projections 31 are arranged vertically and project downwardly into the vessel interior. Lid 14 is caused to rotate about hinge 36 to the closed position to seal the interior of vessel 10 from the environment. Valve 24 of drain opening 18 is closed and water is commenced flowing through inlet port 26. The water may be supplied at any ambient temperature, preferably, from 5° to 40° C at a relatively slow flow rate which may approximate 30 gallons per mintue. The total water volume that may be necessary for the complete cleaning reaction of about 27 filter bags at the same time may be 3,000 gallons.

A reason for the relatively slow rate of flow of incoming water is to control the rate of hydrolysis of water and aluminum chloride. Increasing the water flow rate, increases the generation of gaseous materials. If the water enters the vessel too quickly, there may be too much steam and gas generated, and the heat of reaction may cause the water to boil. Temperature of water should therefore be below 100° C.

As the water level within vessel 10 begins to rise making contact with the aluminum chloride contaminated bag units, the $AlCl_3$ reacts with the water to form $Al_2O_3$, HCl, and steam as the major products of reaction in the form of liquid and gaseous materials. The reaction continues until the water level rises above the level of the filter bags, at which point the reaction will be complete. Essentially, the water-$AlCl_3$ reaction occurs instantaneously upon contact of the water with the contaminated filter bags, tube sheets and bag cages. It is preferred, however, that after total immersion of the filter means in water, a period of 5 to 10 minutes be allowed to pass to insure complete reaction, to allow the violence of the reaction to cease, and to permit some exhaust of gaseous products, among other reasons.

In addition to steam which is generated, HCl will be in water solution, and some HCl will be in gaseous form. The $Al_2O_3$ will be in the form of a precipitate in the liquid, and additionally, there will be a little $AlCl_3$ in solution in the water.

Besides the aluminum chloride which contaminates the filter bags, there may be some sodium chloride, lithium chloride, silicon tetrachloride and/or titanium tetrachloride, which will react with the water. Such compounds are of lesser significance here.

As the chemical reaction takes place, the gaseous materials evolved will be exhausted through the second exhaust opening 34 in the upper portion of vessel 10 to a fugitive gas system for treatment and neutralization. After the vessel 10 is filled, and all chemical reactions are completed, the filter units 30 can be removed from vessel 10 and the bags (filtering material 33) stripped from the tube sheets and bag cages. The units 30 may be removed either before or after the liquid product is discharged from vessel 10 through drain 18, preferably, the latter. The liquid, which essentially is hydrochloric acid of varying concentrations, is discharged to the proper facilities within the plant for neutralizing or handling of the acid. The acid formed could also be recycled to extract component values therefrom.

Exhausting the gaseous products of reaction is facilitated as the water level rises in vessel 10. The gas is substantially free to rise to the upper portions of vessel 10 without being inhibited by splashing or inflowing water or the like. Additionally, the rising body of water in the vessel acts as a coolant to reduce a buildup of heat due to the reaction of $AlCl_3$ with water. Such cooling results in less steam, and thus less total gaseous material, being generated. Spraying or splashing water has little or no cooling effect and thus allows heat to build up, as well as, inhibits the upward flow of gaseous materials.

Thus the method and apparatus of the present invention provide a way of cleaning aluminum chloride contaminated filtering bags used in the recycling and recovery of effluent gases in a controlled manner, thus avoiding the undesirable and unsafe job of spraying bags in a manual manner with the resultant generation of uncontrolled large quantities of fumes. The clean filter materials can then be disposed of in a manner which will not pollute the environment, and the tube sheets and bag cages can be reused and fitted with new filtering bags.

Although preferred embodiments have been decribed and illustrated herein, it will be apparent to those skilled in the art that changes and variations can be made therein without departing from the scope of the invention.

What is claimed is:

1. In a process for electrolysis of aluminum chloride wherein effluent gases contain particles of aluminum chloride and aluminum chloride combinations, said particles are separated from the effluents and accumulate in a filtering means of a separating means, the improvement comprising:
    transferring said filtering means having the particles thereon as an assembled unit from said separating means to a vessel for cleaning;
    placing said filtering means inside the vessel and sealing the vessel from the environment;
    flowing water at a temperature of from 5° to less than 100° C into the lower portion of the vessel until said filtering means is completely immersed therein;
    permitting the water to react with the particles on said filtering means; and
    exhausting gaseous products of reaction from the upper portion of the vessel and exhausting water and products of reaction contained in the water from the lower portion of the vessel thereby cleaning said filtering means.

2. In the system set forth in claim 1, wherein said separating means includes a demister and a permeable filter, said filtering means of said separating means includes a bag-like filter of wool felt.

* * * * *